(12) United States Patent
Ölsner et al.

(10) Patent No.: US 12,314,056 B2
(45) Date of Patent: May 27, 2025

(54) CONTROL AND NAVIGATION DEVICE FOR AN AUTONOMOUSLY MOVING SYSTEM AND AUTONOMOUSLY MOVING SYSTEM

(71) Applicant: Spleenlab GmbH, Saalburg-Ebersdorf (DE)

(72) Inventors: Florian Ölsner, Jena (DE); Benjamin Lewandowski, Erfurt (DE); Chris Hagen, Bad Lobenstein (DE); Ashwanth Ammapalayam Ravichandran, Bad Lobenstein (DE); Stefan Milz, Saalburg-Ebersdorf (DE); Sukumar Karthigeyan, Bad Lobenstein (DE)

(73) Assignee: Boehmert & Boehmert (DE)

( * ) Notice: Subject to any disclaimer, the term of this patent is extended or adjusted under 35 U.S.C. 154(b) by 170 days.

(21) Appl. No.: 17/857,457

(22) Filed: Jul. 5, 2022

(65) Prior Publication Data
US 2023/0004168 A1    Jan. 5, 2023

(30) Foreign Application Priority Data

Jul. 5, 2021   (DE) ..................... 10 2021 117 311.6

(51) Int. Cl.
   *G05D 1/02*    (2020.01)
   *G05D 1/00*    (2024.01)
(52) U.S. Cl.
   CPC ......... *G05D 1/0248* (2013.01); *G05D 1/0088* (2013.01); *G05D 1/0257* (2013.01)
(58) Field of Classification Search
   None
   See application file for complete search history.

(56) References Cited

U.S. PATENT DOCUMENTS

2018/0039272 A1*  2/2018  Seydoux ............... B64C 39/024
2018/0372875 A1* 12/2018  Juelsgaard ............. G05D 1/024
(Continued)

FOREIGN PATENT DOCUMENTS

DE    102006017178    10/2007
DE    102013226267     7/2015
(Continued)

OTHER PUBLICATIONS

Machine translation of WO-2020001892-A1 (Year: 2020).*
Xiang et al., "Mini-UAV-based Remote Sensing: Techniques, Applications and Prospectives", Dec. 19, 2018.

*Primary Examiner* — Amelia Vorce
*Assistant Examiner* — Kyle S Park
(74) *Attorney, Agent, or Firm* — Boyle Frederickson S.C

(57) ABSTRACT

A control and navigation device for an autonomously moving system, which includes: a sensor device, configured to acquire sensor data, and a LiDAR sensor installation, which is configured for 360-degree acquisition; a fisheye camera installation, configured for 360-degree acquisition; and a radar sensor installation, configured for 360-degree acquisition; a data processing installation with an AI-based software application, configured to determine control signals for purposes of navigating an autonomously moving system; and a data communication interface, connected to the data processing installation, and is configured to provide the control signals. The sensor device, the data processing installation, and the data communication interface are arranged at an assembly component to assemble, in a detachable manner, the sensor device, the data processing installation, and the data communication interface together as a common module. Furthermore, an autonomously moving system is provided.

18 Claims, 2 Drawing Sheets

(56) References Cited

U.S. PATENT DOCUMENTS

| | | | | |
|---|---|---|---|---|
| 2020/0142426 A1* | 5/2020 | Gist, IV | ................ | G01S 17/86 |
| 2020/0398985 A1* | 12/2020 | Hsu | ..................... | G08G 1/0969 |
| 2022/0137218 A1* | 5/2022 | Onal | ..................... | G01S 7/4868 |
| | | | | 356/4.01 |
| 2022/0250647 A1* | 8/2022 | Ando | ..................... | B60R 16/04 |

FOREIGN PATENT DOCUMENTS

| | | |
|---|---|---|
| DE | 102017209910 | 12/2018 |
| DE | 102018212174 | 1/2020 |
| EP | 3282335 | 2/2018 |
| WO | 2019094843 | 5/2019 |
| WO | WO-2020001892 A1 * 1/2020 ............. G01S 3/801 |

* cited by examiner

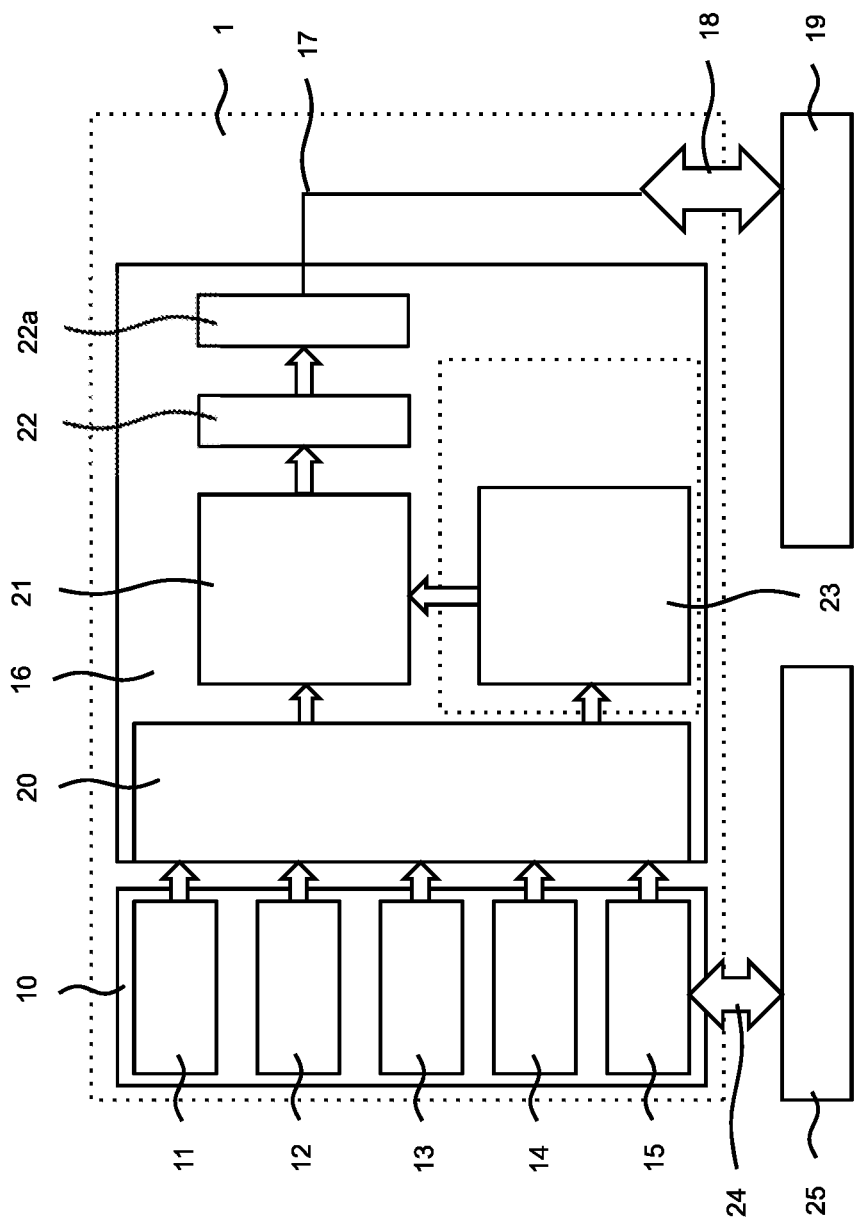

CONTROL AND NAVIGATION DEVICE FOR AN AUTONOMOUSLY MOVING SYSTEM AND AUTONOMOUSLY MOVING SYSTEM

FIELD OF THE INVENTION

The invention relates to a control and navigation device for an autonomously moving system and an autonomously moving system.

BACKGROUND

Systems are understood to act autonomously if they can act without direct human instruction, solve complex tasks, make decisions, learn independently and react to unforeseen events. In the case of an autonomously moving system, the movement or local displacement takes place without direct human instruction, i.e., based on machine-determined control and navigation signals.

In addition to classic industrial and service robots, means of transport in particular are achieving an ever-higher level of automation. The mobility of the future will be determined by autonomous vehicles and aircraft. In addition to autonomously driving cars, autonomously flying aircraft will also come into use, both as unmanned drones and as passenger-carrying air taxis. Furthermore, other means of transport such as ships will also be able to navigate and travel unmanned in the future.

However, such autonomous systems do not necessarily have to be self-sufficient in terms of information acquisition. The autonomous systems most commonly encountered today, such as unmanned aerial vehicles (UAVs), do not exclusively use their own sensor and computing units, but also depend on other sources of information such as a data cloud, an IT infrastructure, or the data of other aircraft or vehicles. However, the dependence on these external sources of information entails the risk that, in cases where the connection to the data sources is interrupted or is not even possible in the first place, the autonomously operating systems will not be able to fulfil their task and may not reach their target.

At the present time there are various approaches that can give motor vehicles, unmanned aerial vehicles or other automata as high a degree of autonomy as possible. Furthermore, there are approaches to the retrofitting of existing vehicles and aircraft with a sensor and computing unit that can give these existing systems an autonomy that they do not possess in their original design.

For example, there are systems of known art in which the sensor technology and computing unit can be installed in a system such as a vehicle or aircraft, so that the sensor and computing technologies do not have to have been originally installed in the autonomous systems. The documents WO 2018/140701 A1 and WO 2019/018315 A1 describe a module that can be attached to drones. The modules have access to a plurality of sensors such as LiDAR scanners and cameras.

In the document WO 2019/222810 A1, a mapping and control system is disclosed, which can also be attached to an aircraft as a payload. This system uses various sensor technologies, such as GPS, LiDAR scanners and cameras. Furthermore, the system has a memory for the storage of flight plan data, as well as a communication interface. The latter establishes a connection to an external processing device, with which the position data and flight plan data are evaluated in order to generate control instructions for the aircraft, which data are then transmitted back to a control system of the aircraft via the communication interface.

The document WO 2020/014740 A1 describes a method for the reconnaissance and mapping of an environment, wherein the method is performed using an aircraft and a user processing system that communicates wirelessly with the aircraft when the aircraft is within its communication range.

The disadvantage of these solutions, however, is that if the wireless communication connection is interrupted, or in environments where such a connection cannot be established in the first place, autonomous flight is made significantly more difficult or, depending on the data situation, even impossible. In particular, in regions that are difficult to access, and which are not equipped with a wireless connection over a wide area, an autonomous flight would therefore not be feasible. The aircraft would therefore be limited to regions or local conditions where the infrastructure is already well developed. However, it is all the more crucial for areas that are difficult to access to be reached by unmanned aerial vehicles or other autonomous systems, for example, in order to be able to provide important supply services.

In the document U.S. Pat. No. 10,489,976 B2, a drone-based system for the investigation and management of traffic accidents is disclosed, in which various sensors can be used. The processing of the acquired data for the traffic accident should also be possible by means of a neural network.

SUMMARY

It is the object of the invention to create a control and navigation device that can be used flexibly in various autonomously moving systems.

The object is achieved by a control and navigation device for an autonomously moving system, and an autonomously moving system, according to the independent claims 1 and 7. Configurations are the subject matter of dependent subsidiary claims.

In accordance with one aspect, a control and navigation device for an autonomously moving system is created, with a sensor device that is configured to acquire sensor data, and for this purpose has the following: a LiDAR sensor device that is configured for 360-degree acquisition; a fisheye camera device that is configured for 360-degree acquisition; and a radar sensor device that is configured for 360-degree acquisition. The control and navigation device furthermore comprises the following: a data processing device with an AI-based software application, which by means of processing of the sensor data is configured to determine control signals for navigating an autonomously moving system; and a data communication interface, which is connected to the data processing device and is configured to provide the control signals for transmission to a controller of the autonomously moving system. The sensor device, the data processing device, and the data communication interface are arranged on an assembly component, which is configured in a detachable manner to assemble together the sensor device, the data processing device, and the data communication interface as a common module on the autonomously moving system.

According to a further aspect, an autonomously moving system is created, in which the control and navigation device is assembled in a detachable manner on a system body.

The embodiment of the control and navigation device with the assembly component, on which all module or device components are arranged, enables a flexible assembly and disassembly on autonomously moving systems of different designs. In particular, it is also possible to retrofit the autonomously moving system with the control and navigation device for autonomous control. The components required for detecting and processing the sensor signals can be assembled together as a build unit or module with the control and navigation device.

The sensor device, the data processing device, and the data communication interface can be arranged in and/or on a common device housing formed on the assembly component.

The sensor device can furthermore have the following: a near-infrared sensor device, which is configured for 360-degree acquisition; and a GPS sensor device.

The sensor device is connected to the data processing device via a data bus.

The control and navigation device has access to an integrated artificial intelligence, for example by means of a neural network. The data processing device can be configured by means of the AI-based software application to execute the data processing processes (on board the autonomous moving system) necessary for the navigation and control of the autonomous system, independently of other computing units external to the control and navigation device.

The neural network can be designed to process all signals acquired by the sensor device such that a uniform 3D-environment map is projected from the different data sets. The individual sensor technologies, such as the LiDAR scanner, fisheye camera and radar, supply different image and signal data for the environment of the autonomous moving system, the quality of which depends on external factors such as visibility conditions, weather and time of day. Using the AI-based software application, a 3D-map of the environment is determined from the application with the aid of data fusion, which map forms the basis for navigation and control of the autonomously moving system.

On the basis of the fused data, the AI-based software application determines a possible and advantageous route for the prescribed movement plan or flight plan.

For this purpose, control instructions are generated, which are transmitted to the control system of the autonomous system via the communication interface. The control system is prompted to execute calculated manoeuvres, and thereby autonomously to execute the stored movement plan.

The various types of sensors of the sensor device supply diverse sensor data, which complement each other depending on the environment and external conditions. By means of the AI-based software application, the diverse sensor data can be fused into a consistent 3D-environment map, which provides a most accurate image of the environment possible, by virtue of the variety of the diverse data.

Depending on the area of application and configuration, the control and navigation device is suitable for use in autonomously flying aircraft, autonomously driving land vehicles, autonomously travelling water vehicles, and autonomously operating robots. The control and navigation device can even be attached to existing systems and be connected by means of the communication interface.

The control and navigation device can include one or a plurality of measures to reduce weight (further). These include, for example, the use of FPGA chips for the hardware, on which the AI-based software application runs. A flat bus system can also be used for data communication, for example a flat ribbon bus system. The LiDAR sensor device can be designed as a LiDAR solid state system. The fisheye camera device can be designed in a weight-reduced form, without a cooling housing, for example.

The control and navigation device can be embodied as an overall unit or common module (with the assembly component) with a total weight of not more than about 1 kg.

The control and navigation device (with the assembly component) can have space-saving maximum external dimensions (L×W×H) of approximately 25 cm×25 cm×25 cm as an overall build unit or common module.

BRIEF DESCRIPTION OF THE DRAWINGS

In what follows further examples of embodiment are explained with reference to figures of an illustration. Here:

FIG. 2 shows a schematic illustration of functional components of the control and navigation device.

DETAILED DESCRIPTION OF THE PREFERRED EMBODIMENTS

Figure 1:
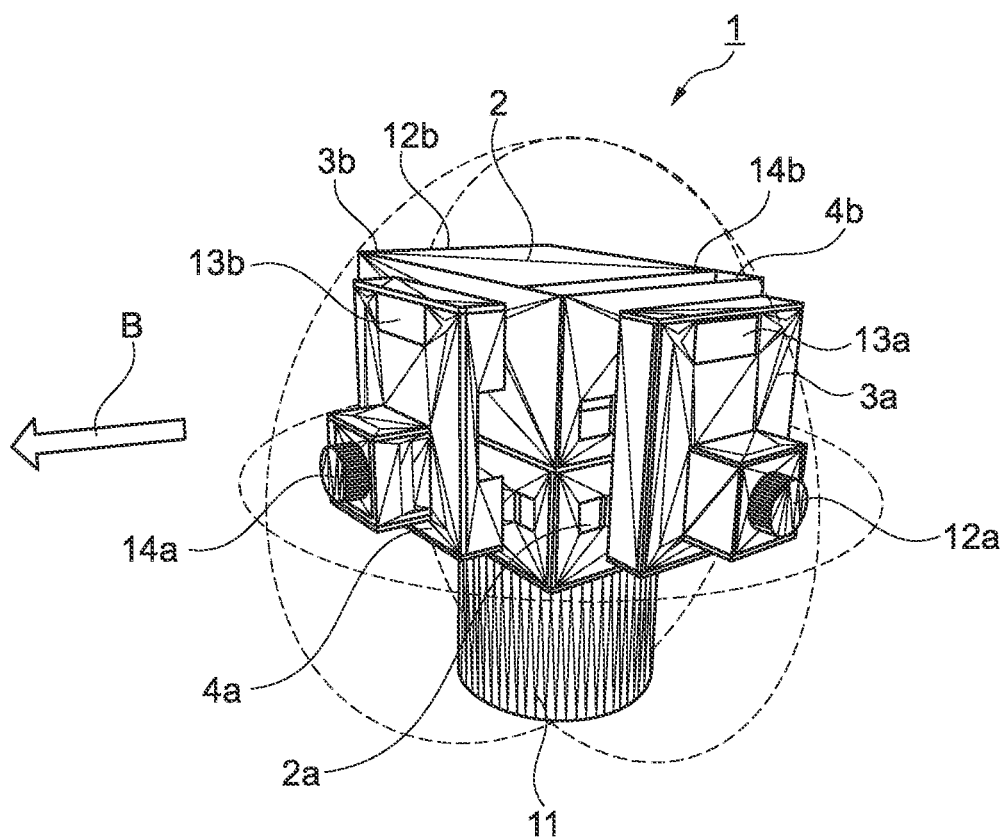
FIG. 1 shows in perspective a schematic illustration of a control and navigation device for an autonomously moving system.

FIG. 1 shows in perspective a schematic illustration of a control and navigation device 1 for an autonomously moving system with a housing 2. In the form of embodiment shown, the housing 2 accommodates all functional components of the control and navigation device 1. The control and navigation device 1 can thus be assembled and disassembled as a complete module on the autonomously moving system (not illustrated).

FIG. 2 shows a schematic illustration of the functional components of the control and navigation device 1. These include a sensor device 10 having: a LiDAR sensor device 11, which is configured for 360-degree acquisition; a fisheye camera device 12, which is configured for 360-degree acquisition; a radar sensor device 13, which is configured for 360-degree acquisition; a near-infrared sensor device 14, which is configured for 360-degree acquisition; and a GPS sensor device 15. With the aid of the sensor device 10, sensor signals or data are acquired for the environment of the autonomously moving system, on which the control and navigation device 1 is mounted.

In the control and navigation device 1, the LiDAR sensor device 11 for 360-degree acquisition is arranged in a lower region, as shown in FIG. 1. The fisheye camera device 12 has a fisheye camera 12a, 12b (hidden) on respectively opposite sides 3a, 3b for 360-acquisition. In a comparable manner, the near-infrared sensor device 14 is designed with near-infrared sensors 14a, 14b in the observation direction B on a front face 4a and a rear face 4b.

A radar sensor 13a, 13b is respectively arranged above the fisheye camera 12a and the near-infrared sensor 14a. Further radar sensors are provided in a comparable manner on the opposite face 3b as well as on the rear face 14b.

Cable openings 2a are designed for guiding cables out of the housing 2.

By means of a data processing device 16 with one or a plurality of processors, the sensor data is processed (cf. FIG. 2) so as to generate control signals for navigating the autonomously moving system, and to provide them at a data communication interface 17, so that the control signals can be transmitted via a data bus 18 to a controller 19 of the autonomously moving system, in order to navigate the latter in the environment.

By means of an appropriate hardware and software configuration, the data processing device 16 implements a plurality of functional components or modules: a sensor fusion module 20, a perception and localisation module 21, a module for determining an environment model 22, a path planning module 22a, and an AI-based perception module 23.

The sensor fusion module 20 is used to process or prepare the measurement or sensor signals acquired by means of the sensor device 10 for subsequent (further) processing. It may be necessary to calibrate the measurement or sensor signals spatially and/or temporally. Measurement or sensor signals can be located in a common coordinate system, for example the coordinate system of the autonomously moving system, for example for a land vehicle, a water vehicle or an aircraft, by means of calibration methods known per se. In terms of time, measurement or sensor signals can be calibrated consistently in time to a common clock.

Alternatively or additionally, monitoring and/or an artefact reduction can be executed. For purposes of artefact reduction, for example, low-level processing can be provided, for example to reduce false positive detections with the LiDAR sensor device 11 in the event of fog and/or spray water. The low-level processing can be executed using deterministic processing. Another example of an artefact reduction is a so-called balancing, so as to reduce the disadvantageous effects of extreme backlighting in the image recordings of the fisheye camera device 12.

One or a plurality of raw data streams can be generated for the measurement or sensor signals. Provision can be made to separate one or a plurality of raw data streams for security reasons. In one embodiment, fused raw data streams are provided and used exclusively for processing in the AI-based perception module 23.

In the AI-based perception module 23, data received from the sensor fusion module 20 is analysed using AI-based algorithms. In particular, this may relate to data originating from the measurement or sensor signals of the following sensor devices: the LiDAR sensor device 11, the fisheye camera device 12, and/or radar sensors 13a, 13b. Here, a neural network can be used for each module, which, starting from the data based on the sensor signals, respectively predicts classification, geometric environment (in particular distances of objects), and/or dynamic environment (in particular the movement or non-movement of the objects) of the autonomously moving system.

The environment perception in the perception and localisation module 21 is based on localisation (own position), geometric environment (distances of objects, for example LiDAR point cloud), classification (type of objects) and dynamics (movement of objects or static).

A movement path for the autonomously moving system is then determined by means of the path planning module 22a, based on a spatial environment model, which was previously determined with the aid of the module for determining an environment model 22, in order to transmit data indicating the movement path to the controller 19 of the autonomously moving system via the data communication interface 17.

Data and signals can be exchanged with one or a plurality of external devices 25 via a data interface 24.

The features disclosed in the above description, in the claims, and in the figures, can be of importance for the implementation of the various embodiments, both individually and in any combination.

The invention claimed is:

1. A control and navigation device for an autonomously moving system, the device comprising:
   a sensor device, which is configured to acquire sensor data, and for this purpose has the following:
      a LiDAR sensor device, which is configured for 360-degree acquisition;
      a fisheye camera device, which is configured for 360-degree acquisition;
      a radar sensor device, which is configured for 360-degree acquisition; and
      a near-infrared sensor device, which is configured for 360-degree acquisition;
   a data processing device with an AI-based software application, which is configured to determine control signals for navigating the autonomously moving system by means of processing of the sensor data; and
   a data communication interface, which is connected to the data processing device and is configured to provide the control signals for transmission to a control device of the autonomously moving system;
   wherein the sensor device, the data processing device, and the data communication interface are arranged at an assembly component, which is configured to assemble, in a detachable manner, the sensor device, the data processing device, and the data communication interface together as a common module at the autonomously moving system; and
   wherein the LiDAR sensor device is arranged in a lower region of the control and navigation device, wherein the fisheye camera device has a respective fisheye camera above the LiDAR sensor device on opposite sides of the control and navigation device, wherein the near-infrared sensor device has a respective near-infrared sensor on a front face and a rear face of the control and navigation device, and wherein the radar sensor device has a respective radar sensor above each of the fisheye cameras and above each of the near-infrared sensors.

2. The control and navigation device according to claim 1, wherein the sensor device, the data processing device, and the data communication interface are arranged in and/or at a common device housing formed at the assembly component.

3. The control and navigation device according to claim 1, wherein the sensor device furthermore comprises a GPS sensor device.

4. The control and navigation device according to claim 1, wherein the sensor device is connected to the data processing device via a data bus.

5. The autonomously moving system, in which the control and navigation device according to claim 1 is assembled in a detachable manner on a system body.

6. The autonomously moving system according to claim 5, selected from the following group: an autonomously flying aircraft, an autonomously driving land vehicle, an autonomously travelling water vehicle, and an autonomously moving robot.

7. The autonomously moving system of claim 1, wherein the arrangement of the sensor device, the data processing device, the data communication interface, and the assembly component enables flexible assembly and disassembly on autonomously moving systems of different designs.

8. The autonomously moving system of claim 1, wherein the AI-based software application uses a neural network built on data originating from sensor signals of the sensor device to predict at least one of classification, geometric environment and dynamic environment of the autonomously moving system.

9. The autonomously moving system of claim 1, wherein the sensor data is fused into a 3-D environment map to provide an image of the environment, and the control and navigation device weighs less than 1 kg.

10. A method for controlling an autonomously moving system, the method comprising:
- acquiring sensor data with a sensor device, the sensor device including:
  - a LiDAR sensor device, which is configured for 360-degree acquisition;
  - a fisheye camera device, which is configured for 360-degree acquisition;
  - a radar sensor device, which is configured for 360-degree acquisition;
  - a near-infrared sensor device, which is configured for 360-degree acquisition;
- determining control signals for navigating the autonomously moving system by processing the sensor data with an AI-based software application with a data processing device; and
- transmitting, with a data communication interface, the control signals to a control device of the autonomously moving system;
- wherein the sensor device, the data processing device, and the data communication interface are arranged at an assembly component, which is configured to assemble, in a detachable manner, the sensor device, the data processing device, and the data communication interface together as a common module at the autonomously moving system;
- wherein the LiDAR sensor device is arranged in a lower region of the control an navigation device, wherein the fisheye camera device has a respective fisheye camera above the LiDAR sensor device on opposite sides of the control and navigation device, wherein the near-infrared sensor device has a respective near-infrared sensor on a front face and a rear face of the control and navigation device, and wherein the radar sensor device has a respective radar sensor above each of the fisheye cameras and above each of the near-infrared sensors.

11. The method of claim 10, wherein the sensor device, the data processing device, and the data communication interface are arranged in and/or at a common device housing formed at the assembly component.

12. The method of claim 10, wherein the sensor device furthermore comprises a GPS sensor device.

13. The method of claim 10, wherein the sensor device is connected to the data processing device via a data bus.

14. The method of claim 10, further comprising assembling a control and navigation device in a detachable manner on a system body.

15. The method of claim 14, wherein the autonomously moving system is selected from the following group: an autonomously flying aircraft, an autonomously driving land vehicle, an autonomously travelling water vehicle, and an autonomously moving robot.

16. The method of claim 10, wherein the arrangement of the sensor device, the data processing device, the data communication interface, and the assembly component enables flexible assembly and disassembly on autonomously moving systems of different designs.

17. The method of claim 10, wherein the AI-based software application uses a neural network built on data originating from sensor signals of the sensor device to predict at least one of classification, geometric environment and dynamic environment of the autonomously moving system.

18. The method of claim 10, wherein the sensor data is fused into a 3-D environment map to provide an image of the environment, and the control and navigation device weighs less than 1 kg.

* * * * *

UNITED STATES PATENT AND TRADEMARK OFFICE
CERTIFICATE OF CORRECTION

| | | |
|---|---|---|
| PATENT NO. | : 12,314,056 B2 | Page 1 of 1 |
| APPLICATION NO. | : 17/857457 | |
| DATED | : May 27, 2025 | |
| INVENTOR(S) | : Ölsner et al. | |

It is certified that error appears in the above-identified patent and that said Letters Patent is hereby corrected as shown below:

On the Title Page

Item (73) Assignee, Please change "Boehmert &Boehmert Germany" to --SPLEENLAB GMBH GERMANY--.

Signed and Sealed this
Fourth Day of November, 2025

John A. Squires
*Director of the United States Patent and Trademark Office*